Dec. 16, 1924.

M. YAGGY 1,519,429

DAIRY STANCHION

Filed July 9, 1923   2 Sheets-Sheet 1

Inventor:
Menno Yaggy,
By
Graham + Harris
Attorneys.

Dec. 16, 1924.  
M. YAGGY  
DAIRY-STANCHION  
Filed July 9, 1923  
1,519,429  
2 Sheets-Sheet 2
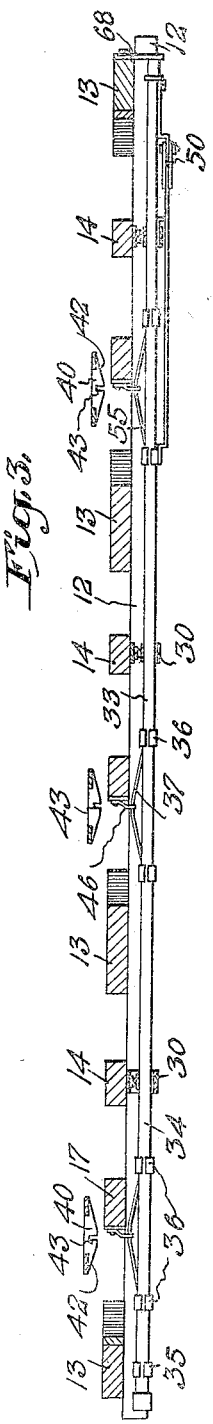
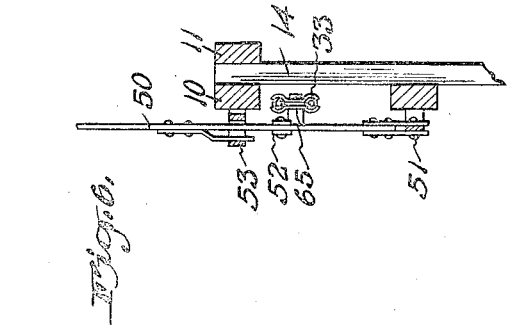
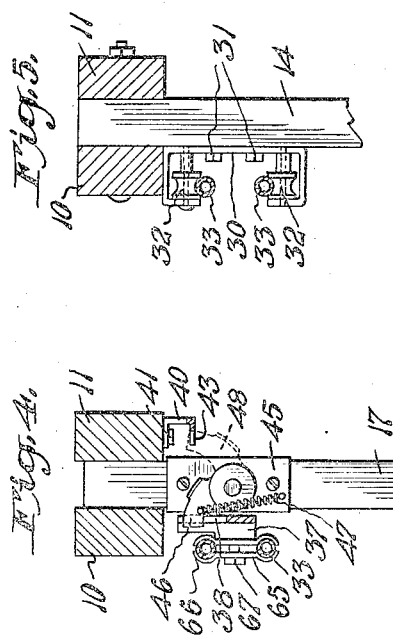
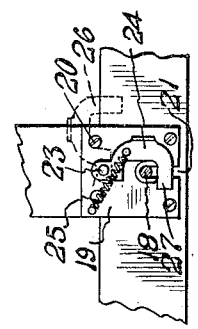
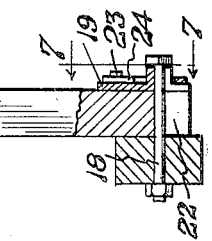
Inventor:  
Menno Yaggy  
by Graham & Davis  
his Attorneys Patented Dec. 16, 1924.

1,519,429

UNITED STATES PATENT OFFICE.

MENNO YAGGY, OF VAN NUYS, CALIFORNIA.

DAIRY STANCHION.

Application filed July 9, 1923. Serial No. 650,229.

*To all whom it may concern:*

Be it known that I, MENNO YAGGY, a citizen of the United States, residing at Van Nuys, in the county of Los Angeles, State of California, have invented a new and useful Dairy Stanchion, of which the following is a specification.

My invention relates to dairy equipment and relates particularly to a dairy stanchion for use in securing cattle during milking and feeding.

It is an object of my invention to provide operating mechanism whereby stanchion members may be operated singly or together, either for the purpose of securing the cattle in the milking and feeding stalls or for releasing them.

It is customary in certain dairy barns to release the cows singly after they have been milked. My invention provides means whereby any stanchion member may be released at any time independently of the rest of the stanchion members. The stanchions furthermore may be closed singly when the remaining stanchions are in open position, thus permitting the placing of one animal in a stall without necessity of closing the entire frame of stanchions.

It is a further object of the invention to provide dairy stanchions having removable parts which may be quickly removed to provide sufficient space for liberating an animal that has fallen in the stall and which would otherwise have its neck wedged in the lower portion of the stanchion.

The invention employs a series of stanchion members in pairs, one of which members in each pair is secured in vertical position and the other of which is hinged at the lower end thereof, so that the upper portion may be swung away from the stationary member, leaving an opening through which the cow's head may freely pass. The invention further provides means for swinging the movable stanchion members in unison into either open or closed position, and also provide means whereby any one of the stanchion members may be opened separately after the series is in closed position, or by which means any one of the stanchions may be closed when the series of stanchions is in opened position, thus making it possible for the dairyman to optionally employ the device.

The especial advantages of the invention and further objects thereof will be made evident hereinafter.

Referring to the drawings which are for illustrative purposes only:

Fig. 3 is a slightly enlarged section taken on a plane represented by the line 3—3 of Fig. 1.

Fig. 4 is a fragmentary section taken upon the plane represented by the line 4—4 of Fig. 1.

Fig. 5 is a fragmentary section taken on a plane represented by the line 5—5 of Fig. 1.

Fig. 6 is a fragmentary section taken as indicated by the line 6—6 in Fig. 1.

Fig. 7 is a fragmentary view partly in section taken on a plane represented by the line 7—7 of Fig. 4.

Figure 1:
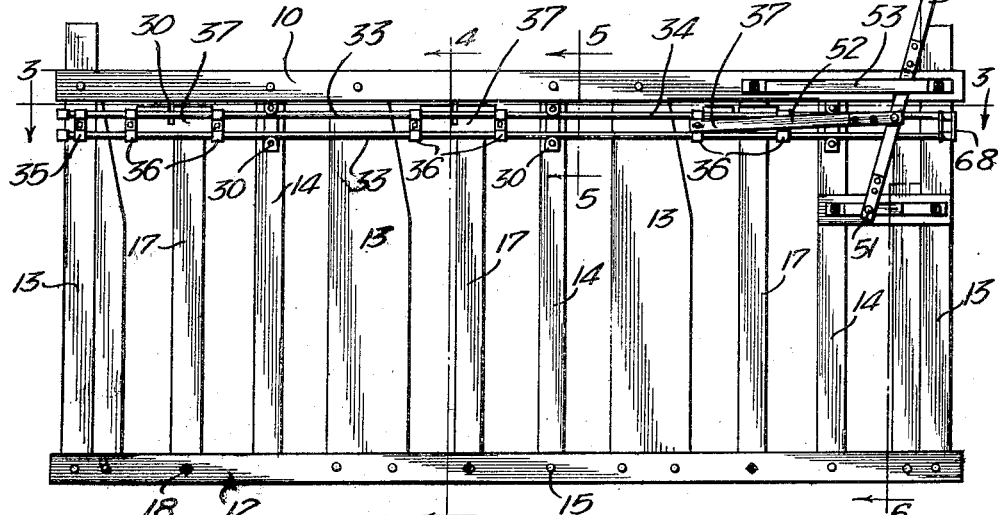
Fig. 1 is a front elevation showing a dairy stanchion employing the features of my invention in closed position.
Figure 2:
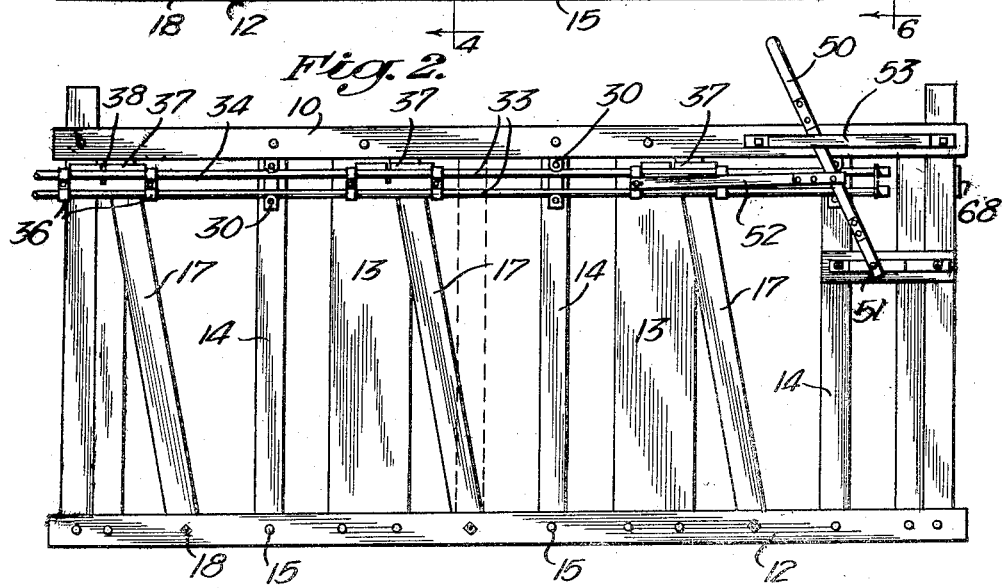
Fig. 2 is an elevation showing the stanchion in opened position.

As shown in Figs. 1 and 2 of the drawing, a preferred form of my invention employs a frame having longitudinal bars 10, 11 and 12 which are held in spaced relationship by cross members 13. Adjacent to each of these cross members 13 is placed a stationary vertical bar 14 which is bolted at 15 to the lower member 12 and spiked between the upper members 10 and 11 shown in Figs. 4, 5 and 6. Movable stanchion members 17 are employed, these members being pivoted as shown in Figs. 4 and 7 upon bolts 18 which extend rearwardly from the lower member 12.

At the lower end of each movable stanchion member 17, a plate 19 is secured by screws 20, this plate having a notch 21 in the lower end thereof, adapted to extend down over the extending portion of the bolt 18, the lower end of the member 17 being similarly notched as indicated at 22 in Fig. 4. At 23, upon the plate 19, a latch member 24 is pivoted and a spring 25 provided for holding the latch 24 in the operative position shown in full lines in Fig. 7, or in the inoperative position shown by the dotted lines 26. When the latch 24 is in closed or operative position as shown in full lines in Fig. 7, the end 27 thereof prevents the stanchion member from being lifted from the bolt 18. The stanchion may be readily removed however, by swinging the latch 24 back into the position 26 and then lifting from the bolt 18.

Upon each of the members 14, a bracket 30 shown in detail in Fig. 5 is mounted with lag screws 31, each of these brackets supports rollers 32 which engage the longitudinal bars 33 of an operating member 34. The operating member 34 employs a pair of bars 33 which are preferably of small diameter pipe or tube-stock held together by clamps 35 and 36. Upon the operating member 34 in positions adjacent to the upper ends of the movable stanchion members 17, engagement plates 37 are supported, these engagement plates 37 being bolted to the clamp members 36 and having vertical slots 38 formed centrally therein.

Upon the under side of the longitudinal bar 11, latch plates 40 are secured by lag screws 41. The plates 40 have the lower edges thereof inclined as indicated at 42 in Fig. 3 and are provided with inwardly disposed notches 43. Near the upper end of each movable stanchion member 17, a plate 45 is mounted, upon which there pivots a lock member 46, which is held by a single spring 47 in the position in which it is shown in full lines in Fig. 4 or the position in which it is shown in dotted lines 48 in that figure.

In the ordinary usage of the stanchion the lock members 46 are maintained in engagement with the slots 38 of the plates 37, as shown in Figs. 3 and 4, so that when the member 34 is moved by manipulating the handle 50 between the positions thereof shown in Figs. 1 and 2, the upper ends of the movable stanchion member 17 will be swung accordingly back and forth, the lock member 46 sliding in the vertical slot 38. The operating handle 50 is pivoted at 51 and connected to the operating member 34 by a link 52, the upper end of the operating lever 50 being slidable under a flat yoke 53.

When the dairy stanchions are closed, as shown in Fig. 1, it is possible by manipulating the lock member 46 to draw it back from engagement with its cooperating slot 38 whereupon it may be singly swung over into open position. When the entire arrangement of stanchion members is opened, this previously opened stanchion member will again become associated therewith for the following reason. It will be noticed that the plates 37 slope inwardly, Fig. 3, and therefore provide inclined faces 55 approaching the slots 38, thus causing the lock 46 of a previously opened stanchion member to ride into its cooperating slot when the plates are moved over into open position. Therefore, when the handle 50 is moved to the right, all of the stanchion members will be closed together.

The invention further permits one of the stanchion members 17 to be swung over from the open position shown in Fig. 2 to closed position and thereupon latched in this position, which enables the placing of a single animal in the stanchion without disturbing the arrangement of the remaining stanchion members. This is accomplished by drawing the lock member 46 over into the position indicated by the dotted lines 48 in which position it is resiliently held by the spring 47. When the stanchion is moved from open position into closed position, the lock member 46 will ride over the inclined edge 42 of the plate member 40 arranged to cooperate therewith and will drop into engagement with the notch 43, thus holding the stanchion member closed independently of the operation of the remaining stanchion members.

At certain times, it is desired to liberate all but one or two of the cattle from the stanchion, this may be accomplished by swinging the lock members 46 over into engagement with slots 43, whereupon the movable stanchion members 17 associated therewith will be held in locked position when the remaining stanchion members are opened.

The construction of the operating member 34 is very simple and efficient. It is possible to quickly adapt the member to any length of stanchion frame by cutting and fitting the rods 33 and clamping them together with the clamps 35 and 36 which are formed from stamped plates 65 having arcuated channel portions 66 at the ends thereof as indicated in Fig. 4 which fit over the bars 33, bolts 67 being provided for fastening the clamp members 65 together. For the purpose of limiting the movement of the closing member 34 in a right hand direction, a stop plate 68 may be employed upon the end cross bar 13.

The provision of removable stanchion members 17 is often found of considerable advantage when the cow collapses in the milking stall, or slips and falls. It is often very difficult to get the head through the opened stanchion members as it will be noticed that when the stanchion members are opened, the lower ends thereof still remain close together. The attachment shown in Fig. 7 of the drawing permits the stanchion member to be readily removed.

The extremely simple and universal locking mechanism may be readily attached to most standard stanchion equipment and the use thereof does not require the building of special stanchions therefor.

I claim as my invention:

1. In a stanchion, the combination of: a series of swingable stanchion members; a movable operating member laterally disposed with respect to said stanchion members; a stationary member disposed adjacent to the swinging ends of said swingable members; and means with each of said stanchion members whereby movement controlling engagement may be made between said stanchion members and said operating member or between said stanchion members and said stationary member.

2. In a stanchion, the combination of: a longitudinal supporting member; a series of swingable stanchion members detachably secured to said longitudinal supporting member in a manner to be quickly disassociated therefrom; a movable operating member laterally disposed with respect to said stanchion members; a stationary member disposed adjacent to the swinging ends of said swingable members; and means with each of said stanchion members whereby movement controlling engagement may be made between said stanchion members and said operating member or between said stanchion members and said stationary member.

3. In a stanchion, the combination of: a longitudinal supporting member; a series of swingable stanchion members detachably secured to said longitudinal supporting member in a manner to be quickly disassociated therefrom; a movable operating member laterally disposed with respect to said stanchion member; a stationary member carrying engagement members; and disengageable means connecting between said stanchion members and said stationary member.

4. In a stanchion, the combination of: a series of swingable stanchion members; a movable operating member laterally disposed with respect to said stanchion members; a stationary member disposed adjacent to the swinging ends of said swingable members; engagement members upon said operating member in positions cooperative with said stanchion members; engagement members upon said stationary member in positions cooperative with said stanchion members in closed position; and means associated with said stanchion members for independently engaging either said engagement members on said operating member or said engagement members on said stationary member.

5. In a stanchion, the combination of: a longitudinal supporting member; a series of swingable stanchion members detachably secured to said longitudinal supporting member in a manner to be quickly disassociated therefrom; a movable operating member laterally disposed with respect to said stanchion members; a stationary member disposed adjacent to the swinging ends of said swingable members; engagement members upon said operating member in positions cooperative with said stanchion members; engagement members upon said stationary member in positions cooperative with said stanchion members in closed position; and means associated with said stanchion members for independently engaging either said engagement members on said operating member or said engagement members on said stationary member.

6. In a stanchion, the combination of: a series of swingable stanchion members; a movable operating member laterally disposed with respect to said stanchion members; a stationary member disposed adjacent to the swinging ends of said swingable members; engagement members upon said operating member in positions cooperative with said stanchion members; engagement members upon said stationary member in positions cooperative with said stanchion members in closed position; and means consisting of a lever pivoted on each of said stanchion members for independently engaging either said engagement members on said operating member or said engagement members on said stationary member.

7. In a stanchion, the combination of: a longitudinal supporting member; a series of swingable stanchion members detachably secured to said longitudinal supporting member in a manner to be quickly disassociated therefrom; a movable operating member laterally disposed with respect to said stanchion members; a stationary member disposed adjacent to the swinging ends of said swingable members; engagement members upon said operating member in positions cooperative with said stanchion members; engagement members upon said stationary member in positions cooperative with said stanchion members in closed position; and means consisting of a lever pivoted on each of said stanchion members for independently engaging either said engagement members on said operating member or said engagement members on said stationary member.

8. In a stanchion, the combination of: a series of swingable stanchion members; a movable operating member laterally disposed with respect to said stanchion members; a stationary member disposed adjacent to the swinging ends of said swingable members; engagment members upon said operating member in positions cooperative with said stanchion members; engagement members upon said stationary member in positions cooperative with said stanchion members in closed position, said engagement members each having a notch therein approached by an inclined face; and means consisting of a lever pivoted on each of said stanchion members for independently engaging either said engagement members on said operating member or said engagement members on said stationary member.

9. In a stanchion, the combination of: a longitudinal supporting member; a series of swingable stanchion members detachably secured to said longitudinal supporting member in a manner to be quickly disassociated therefrom; a movable operating member laterally disposed with respect to said stanchion members; a stationary member disposed adjacent to the swinging ends of said swingable members; engagement members upon said operating member in positions cooperative with said stanchion members; engagement members upon said stationary member in positions cooperative with said stanchion members in closed position, said engagement members each having a notch therein approached by an inclined face; and means consisting of a lever pivoted on each of said stanchion members for independently engaging either said engagement members on said operating member or said engagement members on said stationary member.

10. In a stanchion, the combination of: a series of swingable stanchion members; a movable operating member laterally disposed with respect to said stanchion members, said operating member consisting of a pair of tubular members secured together by clamping members; rollers engaging said tubular members in a manner to support said operating member; a stationary member disposed adjacent to the swinging ends of said swingable members; and means with each of said stanchion members whereby movement controlling engagement may be made between said stanchion members and said operating member or between said stanchion members and said stationary member.

11. In a stanchion, the combination of: a longitudinal supporting member; a series of swingable stanchion members detachably secured to said longitudinal supporting member in a manner to be quickly disassociated therefrom; a movable operating member laterally disposed with respect to said stanchion members, said operating member consisting of a pair of tubular members secured together by clamping members; rollers engaging said tubular members in a manner to support said operating member; a stationary member disposed adjacent to the swinging ends of said swingable members; and means with each of said stanchion members whereby movement controlling engagement may be made between said stanchion members and said operating member or between said stanchion members and said stationary member.

12. In a stanchion, the combination of: a series of swingable stanchion members; a movable operating member laterally disposed with respect to said stanchion members, said operating member consisting of a pair of tubular members secured together by clamping members; rollers engaging said tubular members in a manner to support said operating member; a stationary member disposed adjacent to the swinging ends of said swingable members; engagement members upon said operating member in positions cooperative with said stanchion members; engagement members upon said stationary member in positions cooperative with said stanchion members in closed position; and means associated with said stanchion members for independently engaging either said engagement members on said operating member or said engagement members on said stationary member.

13. In a stanchion, the combination of: a longitudinal supporting member; a series of swingable stanchion members detachably secured to said longitudinal supporting member in a manner to be quickly disassociated therefrom; a movable operating member laterally disposed with respect to said stanchion members, said operating member consisting of a pair of tubular members secured together by clamping members; rollers engaging said tubular members in a manner to support said operating member; a stationary member disposed adjacent to the swinging ends of said swingable members; engagement members upon said operating member in positions cooperative with said stanchion members; engagement members upon said stationary member in positions cooperative with said stanchion members in closed position; and means associated with said stanchion members for independently engaging either said engagement members on said operating member or said engagement members on said stationary member.

14. In a stanchion, the combination of: a series of swingable stanchion members; a movable operating member laterally disposed with respect to said stanchion members, said operating member consisting of a pair of tubular members secured together by clamping members; rollers engaging said tubular members in a manner to support said operating member; a stationary member disposed adjacent to the swinging ends of said swingable members; engagement members upon said operating member in positions cooperative with said stanchion members; engagement members upon said stationary member in positions cooperative with said stanchion members in closed position, said engagement members each having a notch therein approached by an inclined face; and means consisting of a lever pivoted on each of said stanchion members for independently engaging either said engagement members on said operating member or said engagement members on said stationary member.

15. In combination; a lower support; a pin extending from said support; a swingable stanchion member; a plate at the lower end of said stanchion member, having an upwardly extending slot formed therein to enable said plate to be placed over said pin; and a latch member pivoted on said plate for engaging said pin and preventing its removal from said slot.

In testimony whereof, I have hereunto set my hand at Los Angeles, California, this 30th day of June, 1923.

MENNO YAGGY.